United States Patent [19]
Dauvergne

[11] 4,082,235
[45] Apr. 4, 1978

[54] POLE-LESS FISHING RIG

[76] Inventor: Hector A. Dauvergne, P.O. Box 884, San Leandro, Calif. 94577

[21] Appl. No.: 678,741

[22] Filed: Apr. 21, 1976

[51] Int. Cl.² .............................................. A01K 89/00
[52] U.S. Cl. ............................... 242/84.2 J; 43/18 R; 43/54.5 R; 242/85.1; 242/96
[58] Field of Search ........................... 43/54.5 R, 18 R; 242/96, 85.1, 84.2 J

[56] References Cited
U.S. PATENT DOCUMENTS

| 2,684,550 | 7/1954 | Reid | 43/54.5 R |
| 3,010,673 | 11/1961 | Marconi | 43/96 X |
| 3,302,320 | 2/1967 | Breeden | 43/18 R |

*Primary Examiner*—Russell R. Kinsey
*Assistant Examiner*—Daniel J. Leach
*Attorney, Agent, or Firm*—Bielen and Peterson

[57] ABSTRACT

A fishing rig comprised of a simple spool of about five inch diameter which contains the fishing line, with a handle attached to its rear face, and its forward lip flared to permit easy dispersal of the contained fishing line. The central cavity formed by the flared front lip can be divided into compartments for storage of other fishing items, with a snap plastic lid to retain said items within their respective compartments. The compact and portable fishing rig is readily stored in a typical bureau or cabinet drawer, and can be hooked on the belt for hiking. In use, it is easily hand cast as a sling-shot would be used.

5 Claims, 3 Drawing Figures

POLE-LESS FISHING RIG

BACKGROUND OF THE INVENTION

1. Field of the Invention

The pole-less fishing rig is intended as a low-cost, easily stored, easily carried fishing outfit for the apartment dweller, travelling fisherman, and the active youngster. Its combination of low cost and easy storage make it an ideal fishing rig for underpriviledged kids. A large number of these items could be purchased for a modest investment and could be stored in a relatively small space.

2. Prior Disclosure

On Mar. 15, 1976, a Patent Disclosure Document was filed with the Patent Office under the Disclosure Document Program.

SUMMARY OF THE INVENTION

An object of my invention is to provide a portable and easily stored fishing rig whose cost is commensurate with its simplicity.

A further object of my invention is to provide a fishing rig which can be readily used by the young novice fisherman.

The pole-less fishing rig is simple in construction and use, is compact and portable, is inexpensive and is efficient for the purpose intended.

DESCRIPTION OF THE PREFERRED EMBODIMENT

Figure 1:
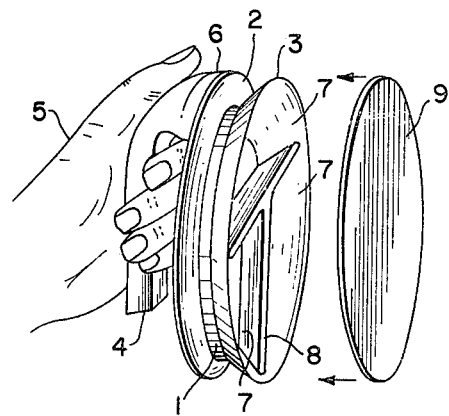
FIG. 1 is an isometric view showing the spool of the fishing rig being held by its handle, with the accessory compartments clearly visible, and the plastic lid in a removed position.

In carrying out my invention, I show the spool, with its cover removed, in FIG. 1, which may be made out of any rigid or semi-rigid moldable material desired, such as plastic. The spool has a cylindrical surface 1 that serves to accept the fishing line, which is retained in the area provided by the rear face 2 and the front lip 3. The handle 4, being held by the hand 5, is integral or firmly attached to the spool rear face at 6. The central area formed by the front lip 3 and rear face 2 can be divided into a number of compartments 7 by the dividers 8 and covered by the lid 9.

Figure 2:
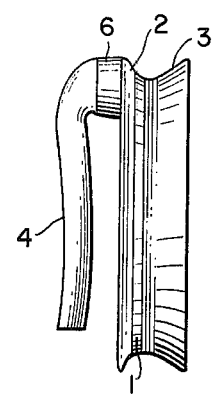
FIG. 2 is a side view showing the geometry of the spool lips and the attachment of the handle.

FIG. 2 clearly shows the line holding area formed by the diameter 1, the rear face 2 and the front lip 3. The gentle flare of the front lip which permits the fishing line to "pay out" when casting is apparent. The relationship of the handle 4 and its attachment point to the spool is also shown.

Figure 3:
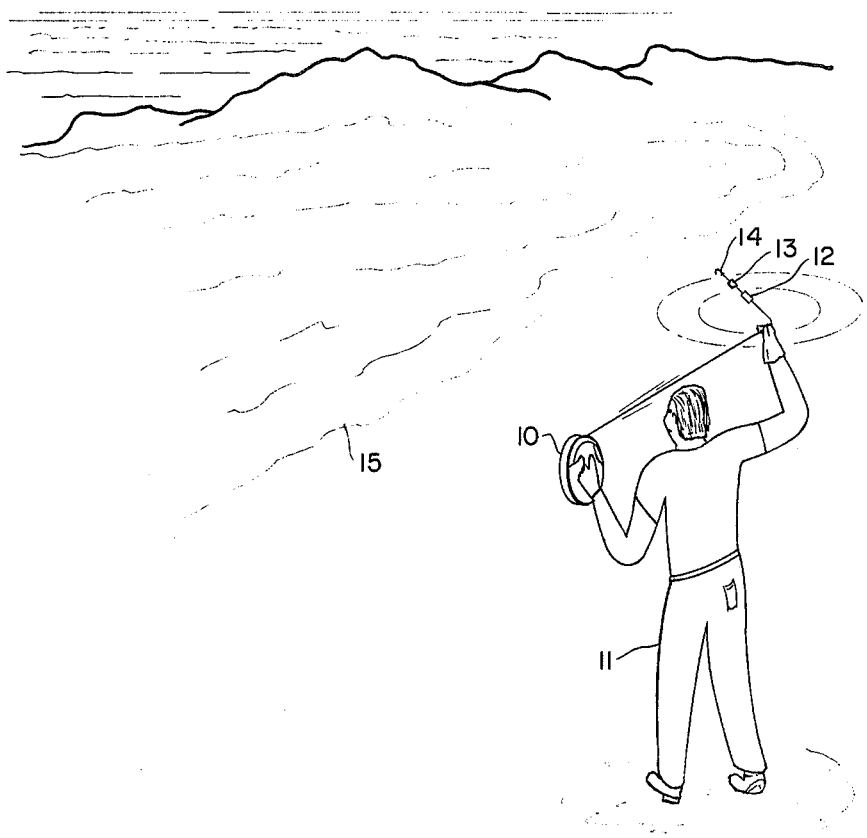
FIG. 3 is a sketch of the fishing rig in casting position, being manipulated by a typical fisherman.

In use, as shown in FIG. 3, the spool 10 is held by the fisherman 11, pointed in the direction desired to cast. The fishing line with attached float 12, weight 13 and hook 14 is whirled about with a gloved hand. The cast is accomplished by releasing the line as the weighted end whirls toward the desired fishing area 15. With the spool pointed in this direction, the fishing line will be permitted to disperse over the flared front lip.

The fishing line is retrieved by simply winding the line over the spool with the gloved hand using the same motion as for a conventional fishing reel.

I claim:

1. A compact and easily transported pole-less fishing rig having:
   (a) a line containing area formed by a short cylindrical section, a rear face and a flared front lip wherein the short cylindrical section is substantially narrower than the front lip;
   (b) an integral, firmly attached handle for manipulation during use and for carrying on the belt; and,
   (c) a central compartment area for accessory storage, formed by the flared front lip and covered by a removable plastic lid; wherein,
   the flared front lip has an outward flare adapted to act as a control for the successive release of fishing line during casting.

2. The fishing rig of claim 1 wherein the front lip is flared outwardly approximately thirty degrees from the cylindrical section.

3. The fishing rig of claim 2 wherein the width of the line containing area is less than half of the diameter of the cylindrical section.

4. The fishing rig of claim 3 wherein the diameter of the line containing area is approximately five inches.

5. The fishing rig of claim 1 wherein the handle is attached to the rear face and oriented proximate to the line containing area.

* * * * *